(12) United States Patent  
Halverson

(10) Patent No.: US 6,301,564 B1  
(45) Date of Patent: Oct. 9, 2001

(54) DIMENSIONAL DINING RESTAURANT MANAGEMENT SYSTEM

(76) Inventor: Helena B. Halverson, 814 Pebble Creek Dr., St. Cloud, MN (US) 56303

( * ) Notice: Subject to any disclaimer, the term of this patent is extended or adjusted under 35 U.S.C. 154(b) by 0 days.

(21) Appl. No.: 09/378,027

(22) Filed: Aug. 20, 1999

(51) Int. Cl.[7] .................................................. G60F 17/60
(52) U.S. Cl. .............................................................. 705/15
(58) Field of Search ................................................ 705/15

(56) References Cited

U.S. PATENT DOCUMENTS

| | | |
|---|---|---|
| 4,149,246 | 4/1979 | Goldman . |
| 4,445,178 | 4/1984 | Scheer et al. . |
| 4,547,851 * | 10/1985 | Kurland ................................. 705/15 |
| 5,357,426 | 10/1994 | Morita et al. . |
| 5,893,075 * | 4/1999 | Plainfield et al. ..................... 705/15 |

FOREIGN PATENT DOCUMENTS 10-49607 * 2/1998 (JP) .

OTHER PUBLICATIONS

"Patron Preferences For Features Offered By Licensed Clubs" by Adrian O. Bull and Keith M. Alcock, International Journal of Contemporary Hospitality Management vol. 5 No. 1, pp. 28–32, 1993.*

"Concept Selection For Independent Restaurants" by Kieth L. Goldman, Cornell Hotel & Restaurant Quarterly vol. 34, No. 6, pp. 59–72, Dec. 1993.*

"Practical Applications Of music In Service Settings" by J. Duncan Herrington and Louis M. Capella, Journal of Services Marketing vol. 8 No. 3, pp. 50–65, 1994.*

"Changing Tastes: An R&I Survey Examines The Dining Habits Of An Increasingly Diverse Foodservice Clientele" by Jacqueline Dulen, Restaurants & Institutions vol. 108 No. 3, p. 58, Feb. 1, 1998.*

* cited by examiner

Primary Examiner—Kenneth R. Rice

(57) ABSTRACT

Apparatus and method for mass producing a unique dining experience for each individual diner within a group of patrons includes computers, applications software, models and databases. Through various alternative input mechanisms, each individual patron's preferences will be surveyed, and the results of the surveys are stored within the database. Staff and management of an establishment are also surveyed regarding various personal and facilities capabilities and assets. The preference surveys may be quite basic in nature, but with more detailed surveys a more elaborate model may be generated. Based upon the preference survey results, a dining event is developed that groups patrons according to areas of agreement among surveys, while simultaneously tailoring unique events or decor based upon the preference survey results that are not common among the patrons. The dining event is prepared for, including training of staff and management, and the dining event is then staged. During the event, an off-site person will most preferably provide monitor and provide feedback to the staff and management, and subsequent to the event further evaluation will occur. Based upon the event results and evaluation, the database and model may be updated. Electronic devices may form a part of the apparatus, and in this case will most preferably be controlled by computerized components to perform appropriately according to the stored model of the event. As a result of the differences in preferences, skills and assets of all participants, no two dining events will be identical. However, each dining event is designed and prepared according to pre-established models to fulfill each of the needs and expectations of each individual patron while simultaneously capitalizing on the strengths and talents of a staff and facility. Simultaneously, the managerial burden of maintaining a single atmosphere within an establishment is relieved, and patrons are offered unexpected, but consistently high-quality, dining experiences.

19 Claims, 15 Drawing Sheets

Preference survey - Soups

Soups, stews, and chowders

| Bean | Like/Dislike |
|---|---|
| Ham and bean | Like/Dislike |
| Beef barley | Like/Dislike |
| Beef noodle | Like/Dislike |
| Beef vegetable | Like/Dislike |
| Cauliflower cheese | Like/Dislike |
| Chicken and rice | Like/Dislike |
| Chicken gumbo | Like/Dislike |
| Chicken noodle | Like/Dislike |
| Clam chowder | Like/Dislike |
| Corn chowder | Like/Dislike |
| Potato chowder | Like/Dislike |
| Cream of asparagus | Like/Dislike |
| Cream of Broccoli | Like/Dislike |
| Cream of celery | Like/Dislike |
| Cream of chicken | Like/Dislike |
| Cream of mushroom | Like/Dislike |
| Cream of potato | Like/Dislike |
| French onion | Like/Dislike |
| Minestrone | Like/Dislike |
| Split pea | Like/Dislike |
| Tomato | Like/Dislike |
| Wild rice | Like/Dislike |
| Cheese | Like/Dislike |
| Specify: | |

FIG. 8

Breakfast Foods

Preferences Survey - Breakfast Foods

| Breakfast Foods | Like/Dislike | with Milk/Cream | with sugar/brown sugar | with fruit |
|---|---|---|---|---|
| Cereal (Hot) | | | | |
| Oatmeal | Like/Dislike | with Milk/Cream | with sugar/brown sugar | with fruit |
| Cream of Wheat | Like/Dislike | with Milk/Cream | with sugar/brown sugar | with fruit |
| Cooked rice | Like/Dislike | with Milk/Cream | with sugar/brown sugar | with fruit |
| Farina | Like/Dislike | with Milk/Cream | with sugar/brown sugar | with fruit |
| Grits | Like/Dislike | with Milk/Cream | with sugar/brown sugar | with fruit |
| Malt-O-Meal | Like/Dislike | with Milk/Cream | with sugar/brown sugar | with fruit |
| Cereal (Cold) | | | | |
| All-Bran | Like/Dislike | with Milk/Cream | with sugar/brown sugar | with fruit |
| Bran Flakes | Like/Dislike | with Milk/Cream | with sugar/brown sugar | with fruit |
| Cheerios | Like/Dislike | with Milk/Cream | with sugar/brown sugar | with fruit |
| Corn Flakes | Like/Dislike | with Milk/Cream | with sugar/brown sugar | with fruit |
| Grape Nuts | Like/Dislike | with Milk/Cream | with sugar/brown sugar | with fruit |
| Rice Krispies | Like/Dislike | with Milk/Cream | with sugar/brown sugar | with fruit |
| Special K | Like/Dislike | with Milk/Cream | with sugar/brown sugar | with fruit |
| Wheaties | Like/Dislike | with Milk/Cream | with sugar/brown sugar | with fruit |
| Shredded wheat | Like/Dislike | with Milk/Cream | with sugar/brown sugar | with fruit |
| Specify: | | | | |

Preference Survey - Protein

| Type of Protein | Like/Dislike | Will/Will not eat | Preference | Preparation method or type | Special requirements |
|---|---|---|---|---|---|
| Egg | Like/Dislike | Will/Will not eat | | Hard boil, coddle, fry, scramble, omelet | |
| Cheese | Like/Dislike | Will/Will not eat | | Cottage cheese, cream cheese, cheese spread American, Swiss, cheddar, blue cheese, roquefort, parmesan, Specify: | |
| Tofu | Like/Dislike | Will/Will not eat | | | |
| Poultry | | | | | |
| Chicken | Like/Dislike | Will/Will not eat | Like white/dark meat | Roasted, pan fried, deep fried, plain/coated, spiced, cream sauce, stewed, fricassee, pot pie | |
| Turkey | Like/Dislike | Will/Will not eat | Like white/dark meat | Roasted, pan fried, deep fried, plain/coated, spiced, cream sauce, stewed, fricassee, pot pie | |
| Duck | Like/Dislike | Will/Will not eat | | | |
| Goose | Like/Dislike | Will/Will not eat | | | |
| Squab | Like/Dislike | Will/Will not eat | | | |
| Fish | | | | | |
| Salmon | Like/Dislike | Will/Will not eat | | Baked, pan fried, deep fried, smoked, plain/coated, loaf | |
| Cod | Like/Dislike | Will/Will not eat | | Baked, pan fried, deep fried, smoked, plain/coated | |
| Catfish | Like/Dislike | Will/Will not eat | | Baked, pan fried, deep fried, smoked, plain/coated | |
| Walleye | Like/Dislike | Will/Will not eat | | Baked, pan fried, deep fried, smoked, plain/coated | |
| Fish cakes/sticks | Like/Dislike | Will/Will not eat | | Baked, pan fried, deep fried, smoked, plain/coated | |
| Squid/octopus | Like/Dislike | Will/Will not eat | | Baked, pan fried, deep fried, smoked, plain/coated | |
| Tuna | Like/Dislike | Will/Will not eat | | Baked, salad, in casseroles | |
| Herring | Like/Dislike | Will/Will not eat | | Pickled, smoked, broiled | |
| Anchovy | Like/Dislike | Will/Will not eat | | Fillet, paste | |
| Sardines | Like/Dislike | Will/Will not eat | | in oil, in tomato sauce | |
| Trout | Like/Dislike | Will/Will not eat | | Baked, pan fried, deep fried, smoked, plain/coated | |
| Turtle | Like/Dislike | Will/Will not eat | | | |
| Shellfish | Like/Dislike | Will/Will not eat | | | |
| Shrimp | Like/Dislike | Will/Will not eat | | Plain/coated, deep fried, sauted, cold in salads | |
| Lobster | Like/Dislike | Will/Will not eat | | Plain/coated, deep fried, sauted, cold in salads | |
| Crab | Like/Dislike | Will/Will not eat | | Plain/coated, deep fried, sauted, cold in salads | |
| Scallops | Like/Dislike | Will/Will not eat | | Plain/coated, deep fried, sauted, cold in salads | |
| Imitation(pollock) | Like/Dislike | Will/Will not eat | | Plain/coated, deep fried, sauted, cold in salads | |
| Oysters | Like/Dislike | Will/Will not eat | | Raw, smoked, fried, stew | |
| Clams | Like/Dislike | Will/Will not eat | | Chowder | |

Preference Survey - Beverages

| Beverages w/meal | Named brand | Breakfast | Lunch | Dinner | AfternoonSnack |
|---|---|---|---|---|---|
| Milk | | Like/Dislike | Like/Dislike | Like/Dislike | Like/Dislike |
| Whole milk | | Like/Dislike | Like/Dislike | Like/Dislike | Like/Dislike |
| Skim milk | | Like/Dislike | Like/Dislike | Like/Dislike | Like/Dislike |
| 1% milk | | Like/Dislike | Like/Dislike | Like/Dislike | Like/Dislike |
| 2% milk | | Like/Dislike | Like/Dislike | Like/Dislike | Like/Dislike |
| Soy milk | | Like/Dislike | Like/Dislike | Like/Dislike | Like/Dislike |
| Chocolate milk | | Like/Dislike | Like/Dislike | Like/Dislike | Like/Dislike |
| Hot chocolate | | Like/Dislike | Like/Dislike | Like/Dislike | Like/Dislike |
| Buttermilk | | Like/Dislike | Like/Dislike | Like/Dislike | Like/Dislike |
| Eggnog | | Like/Dislike | Like/Dislike | Like/Dislike | Like/Dislike |
| Milk shake | | Like/Dislike | Like/Dislike | Like/Dislike | Like/Dislike |
| Malted milk | | Like/Dislike | Like/Dislike | Like/Dislike | Like/Dislike |
| Yogurt, plain | | Like/Dislike | Like/Dislike | Like/Dislike | Like/Dislike |
| Yogurt, flavored | | Like/Dislike | Like/Dislike | Like/Dislike | Like/Dislike |
| Water | | | | | |
| Carbonated water | | Like/Dislike | Like/Dislike | Like/Dislike | Like/Dislike |
| Ice water | | Like/Dislike | Like/Dislike | Like/Dislike | Like/Dislike |
| Water w/o ice | | Like/Dislike | Like/Dislike | Like/Dislike | Like/Dislike |
| Water w/lime | | Like/Dislike | Like/Dislike | Like/Dislike | Like/Dislike |
| Flavored water | | Like/Dislike | Like/Dislike | Like/Dislike | Like/Dislike |
| Coffee | | | | | |
| Caffeinated | | Like/Dislike | Like/Dislike | Like/Dislike | Like/Dislike |
| De-caf coffee | | Like/Dislike | Like/Dislike | Like/Dislike | Like/Dislike |
| Flavored coffee | | Like/Dislike | Like/Dislike | Like/Dislike | Like/Dislike |
| Tea | | | | | |
| Ice tea | | Like/Dislike | Like/Dislike | Like/Dislike | Like/Dislike |
| Caffeinated | | Like/Dislike | Like/Dislike | Like/Dislike | Like/Dislike |
| De-caffeinated | | Like/Dislike | Like/Dislike | Like/Dislike | Like/Dislike |
| Black tea | | Like/Dislike | Like/Dislike | Like/Dislike | Like/Dislike |
| Green tea | | Like/Dislike | Like/Dislike | Like/Dislike | Like/Dislike |
| Flavored herbal | | Like/Dislike | Like/Dislike | Like/Dislike | Like/Dislike |
| Soda | | Like/Dislike | Like/Dislike | Like/Dislike | Like/Dislike |
| Caffeinated | | Like/Dislike | Like/Dislike | Like/Dislike | Like/Dislike |
| De-caffeinated | | Like/Dislike | Like/Dislike | Like/Dislike | Like/Dislike |
| Diet | | Like/Dislike | Like/Dislike | Like/Dislike | Like/Dislike |
| Regular | | Like/Dislike | Like/Dislike | Like/Dislike | Like/Dislike |
| Lemonade | | | | | |
| Regular | | Like/Dislike | Like/Dislike | Like/Dislike | Like/Dislike |
| Pink | | Like/Dislike | Like/Dislike | Like/Dislike | Like/Dislike |
| Juice | | | | | |
| Tomato | | Like/Dislike | Like/Dislike | Like/Dislike | Like/Dislike |
| Vegetable | | Like/Dislike | Like/Dislike | Like/Dislike | Like/Dislike |

FIG.11

Preferences - Personal Choices

| I like to eat breakfast at | Weekdays | Saturday | Sunday |
|---|---|---|---|
| | 5:00am | 5:00am | 5:00am |
| | 5:30am | 5:30am | 5:30am |
| | 6:00am | 6:00am | 6:00am |
| | 6:30am | 6:30am | 6:30am |
| | 7:00am | 7:00am | 7:00am |
| | 7:30am | 7:30am | 7:30am |
| | 8:00am | 8:00am | 8:00am |
| | 8:30am | 8:30am | 8:30am |
| | 9:00am | 9:00am | 9:00am |
| | 9:30am | 9:30am | 9:30am |
| | Specify: | Specify: | Specify: |

| I like to eat lunch at | Weekdays | Saturday | Sunday |
|---|---|---|---|
| | 11:00am | 11:00am | 11:00an |
| | 11:30am | 11:30am | 11:30an |
| | 12:00am | 12:00am | 12:00an |
| | 12:30pm | 12:30pm | 12:30pn |
| | 1:00pm | 1:00pm | 1:00pm |
| | 1:30pm | 1:30pm | 1:30pm |
| | 2:00pm | 2:00pm | 2:00pm |
| | 2:30pm | 2:30pm | 2:30pm |
| | Specify: | Specify: | Specify: |

| I enjoy a coffee break at | Weekdays | Saturday | Sunday |
|---|---|---|---|
| | 1:30pm | 1:30pm | 1:30pm |
| | 2:00pm | 2:00pm | 2:00pm |
| | 2:30pm | 2:30pm | 2:30pm |
| | 3:00pm | 3:00pm | 3:00pm |
| | 3:30pm | 3:30pm | 3:30pm |
| | 4:00pm | 4:00pm | 4:00pm |
| | Specify: | Specify: | Specify: |

| I like to eat dinner at | Weekdays | Saturday | Sunday |
|---|---|---|---|
| | 4:00pm | 4:00pm | 4:00pm |
| | 4:30pm | 4:30pm | 4:30pm |
| | 5:00pm | 5:00pm | 5:00pm |
| | 5:30pm | 5:30pm | 5:30pm |
| | 6:00pm | 6:00pm | 6:00pm |
| | 6:30pm | 6:30pm | 6:30pm |
| | 7:00pm | 7:00pm | 7:00pm |
| | 7:30pm | 7:30pm | 7:30pm |
| | 8:00pm | 8:00pm | 8:00pm |
| | 8:30pm | 8:30pm | 8:30pm |
| | Specify: | Specify: | Specify |

| I like a bedtime snack at | Weekdays | Saturday | Sunday |
|---|---|---|---|
| | 7:00pm | 7:00pm | 7:00pm |
| | 7:30pm | 7:30pm | 7:30pm |

FIG.12

DIMENSIONAL DINING RESTAURANT MANAGEMENT SYSTEM

BACKGROUND OF THE INVENTION

1. Field of the Invention

The present invention pertains to food preparation and delivery generally, and more particularly to an improved apparatus and method for recording diner preferences, correlating those preferences with available options, and generating control signals, events and actions important in food selection, preparation, and delivery. The apparatus most preferably includes further means to enable or enhance selection, preparation and delivery in cooperation with the generation of control signals, events and actions.

2. Description of the Related Art

Each and every person around the planet, through a multitude of conscious and sub-conscious steps, seeks desired dining experiences several times each day. In spite of the staggering billions of hours each day that are put into dining, the art of food preparation and delivery is quite fragmented, labor intensive, and inconsistent. Furthermore, there is a general lack of attention to the senses, other than taste, in typical food service establishments.

As a first step in pursuing a desired dining experience, each person must first determine what type of food or method of preparation will be most preferable for the particular meal. Particular food types, methods of preparation and national origins are well-defined and quite consciously selected, and meal planning is most frequently focussed here. As an example, the discussion may be whether to have steak or Chinese food.

Atmosphere, on the other hand, is not so clearly delineated. Atmosphere is almost always decided upon only by the selection of one dining location over another, without conscious evaluation of any specific factors desired. Yet a multitude of factors comprise an atmosphere, sometimes also referred to as "mood", and include such things as sounds, sights, colors, smells, textures and feeling. In fact, though dependent upon the individual to some degree, all of a person's senses are involved in the atmosphere, though only a few are normally evaluated consciously. Moreover, only a few dining establishments attempt to address the atmosphere in a coherent way.

Finally, associated costs will be factored in with food type and atmosphere. Every person has limits on how much they are willing to spend at any given moment for a particular dining experience. That amount is considered in conjunction with the food type and atmosphere, and can not be ignored.

Once food type, cost and atmosphere are determined, the individual will then attempt to achieve the dining experience. This may be done by patronizing a restaurant or other dining establishment, or, alternatively, the food may be prepared by the individual or someone close to the individual. In the case of self-creation and preparation, supplies are generally purchased in advance from several different retail stores. The number of stores visited during the purchase process is determined by the complexity of the atmosphere and menu selected, but in many instances a more fulfilling dining experience requires visiting two or more diverse retail locations. Between planning for the meal, purchasing supplies and then preparing everything required, self-preparation of more than a basic meal can be quite labor intensive. Unfortunately, in addition to being labor intensive, it is almost a certainty that the individual will fail to fully achieve the desired affect.

As an example, many people have, at one time or another, burned an entree. Not only does the single entree need disposed of, the aroma must also be taken care of effectively or the smell will undesirably detract from the dining experience. However, eliminating the aroma of the burned entree is a task which is often not achievable in the limited time period available close to serving the meal, nor is a home kitchen designed to isolate the cooking aromas from the dining area. The individual has now not only consumed an enormous amount of time and effort, but may also be terribly frenzied and unable to fulfill the remainder of the objectives effectively. Unfortunately then, for self-preparation of any but the most basic of meals, exceptional cooking skills and poise are required to succeed. In addition, the individual will also have to be skilled in decorating, arrangement of music or other sounds, and other skills needed to address the many subconscious factors involved in a dining experience. There are very few people who, by themselves, are capable of preparing and delivering an exceptional dining experience, and even fewer willing to undergo the pressures and effort necessary to do so. Nor are there any tools available to assist them, other than supplies fragmented throughout diverse retail stores.

To reduce the risk of failure, or to simply reduce the burden associated with delivery of a particular dining experience, most frequently a person will instead patronize a particular food establishment. As aforementioned, the food establishment is selected from a multitude of restaurants based upon food selection and type or national origin, the atmosphere within the establishment, and the cost associated therewith. Most dining establishments recognize the importance of food types in generating a satisfying dining experience. Within the same dining establishment, there is often more than one food type available. By slightly expanding the menu, a dining establishment is able to satisfy food preferences of each individual within a larger group, even though not everyone in the group would have selected the food type that is the particular specialty of the dining establishment.

Though often not consciously understood, the cost or perceived value of a dining establishment's food is often related to the availability of the atmosphere associated with the restaurant. For example, fast food establishments may be filled with hustle and bustle, including many diverse sights, sounds and smells during the prime meal times. This atmosphere is one option available to a prospective patron. It is not normally carefully controlled, and presents a random environment that can be quite stimulating at times, relatively plain and boring at other times, and at yet other times completely frustrating. Absent any further controls or design, this atmosphere is relatively commonplace, being available at many places of work and at many diverse retail establishments and outlets. As a result of how common the atmosphere is, this particular atmosphere does not normally command any economic advantage to the owner of the establishment, even though at times it will be the preferred atmosphere of patrons.

Where a more carefully controlled environment is desired by the patrons, and more particularly a less commonplace atmosphere, fast food and similar restaurants will likely be eliminated from the selection list. By considering each of the available remaining options with respect to food, cost and atmosphere, a person will eventually choose one or several suitable, available dining establishments. The dining establishment may be exactly what the person is seeking, or may alternatively be a "best fit", which is tolerable at the time.

There are a number of disadvantages to this common method of selection of a dining establishment. First and foremost, the patron now has expectations regarding the food type, cost and atmosphere associated with the particular establishment. The establishment must therefore work diligently to maintain a consistent food quality and menu selection, work force, cost and atmosphere. The degree of success achieved by the establishment will directly impact the success or failure of the establishment. For example, particularly on a first visit, patrons will judge the restaurant most harshly, and may be biased for a long period thereafter. Yet, it is at the opening that the restaurant is most vulnerable, since employees may not have developed experience with their co-workers and with the goals of the establishment, and patrons may not accurately understand the desired atmosphere. One set of patrons may expect a quiet atmosphere, while another set may wish to include all of their family members, and may bring with a particularly noisy or unruly youngster or infant. With a more experienced employee base, the establishment will help the patrons with the youngster, and will have developed a skill set for doing so. Additionally, they may further have developed a way or set of skills to appease the remaining patrons. In this way, once the employees' skills are developed, the restaurant can better maintain a desired atmosphere. Nevertheless, and as aforementioned, this requires a highly skilled base of employees and represents an enormous managerial burden.

Because of the managerial burden, which is present during every minute the dining establishment is open, there are also few dining establishment proprietors who are willing and able to make the sacrifices necessary to maintain consistent dining experience. This in turn reduces the number of establishments that are successful and therefore available to choose from. To better understand the scope of the issue, recognize that the proprietor must determine, even prior to going into business, exactly what that atmosphere will be, and then develop it in every way. This includes a comprehensive package of advertising, restaurant location, construction and decoration, employee training and so on to support that atmosphere. Moreover, to maintain that atmosphere, the proprietor in many cases must spend countless hours supervising and monitoring to ensure that everything stays as envisioned by the proprietor. In the event the proprietor inaccurately assessed the marketplace, the restaurant will still fail, and there is little if any opportunity for the restaurant owner to salvage investment. As aforementioned then, in all but the most highly populated areas, there is a relatively limited selection of dining establishments and an even more limited choice of atmosphere available, and, unlike the expanded menu to offer more food types, there is no flexibility regarding the atmosphere within a given establishment.

Further compounding the already less than desirable circumstances surrounding dining, there are also many situations where there is not a choice available to the patron. For example, in many schools, dormitories, retirement centers, nursing homes, and many other locations that combine food and lodging, the patron has no choice but the food service provided for through a single cafeteria. While the cafeteria may truly attempt to maintain high quality food and provide a varying atmosphere, this will frequently be quite haphazard. When, for example, there is a small amount of surplus time, the employees might change the seasonal decoration to the coming holiday, or in honor of another special event to add variety to the atmosphere. Unfortunately, even in the best of mess halls and cafeterias, this is the most that can be expected for atmosphere.

Finally, and exasperated in part because of the many factors that affect a dining experience, the probability of a single establishment satisfying all diners decreases greatly as more people are added in the decision making process. Within a larger group of people, one dining establishment as heretofore known to those skilled in the art finds satisfying everyone's tastes and preferences for atmosphere extremely difficult or impossible. To best fulfill the expectations of a larger group, the dining experience is frequently reduced to a minimum of sensory input other than food type selection.

Since time immemorial, every person has had a requisite need for food. For nearly that time, there has been an awareness, at least on a subconscious level, of the desirability of combining more sensory inputs than taste into a dining experience. Nevertheless, there has not yet been developed a coherent method or apparatus which enables individuals and dining establishments to consciously select from diverse sensory inputs beyond food type and origin in the dining experience. These other sensory inputs have, in the past, been predetermined and fixed at the time of creation of the particular establishment, or been left to the skills and determination of an individual who would try to achieve a unique dining experience on their own.

SUMMARY OF THE INVENTION

In a first manifestation, the invention is an apparatus for polling individuals regarding their sensory preferences pertaining to dining. The polls are tabulated and compared with models for creating a unique dining experience for each individual, and the model which best fits the sensory preferences and capabilities of the dining institution is selected for implementation. A variety of additional tools and apparatus are then integrated into the dining experience based upon the model, to deliver the best possible dining experience customized to each individual. The model also is useful to attract and satisfy a group comprised of many individuals.

In a second manifestation, the invention is a method for developing, coordinating and delivering a dining event to provide essential food and beverage while simultaneously stimulating positive actions and interaction among people by optimally using resources, comprising the steps of gathering management data regarding facilities capabilities and configuration and management preferences; gathering staff data regarding skills, experiences and preferences; and diners regarding experiences and multi-sensory preferences; correlating the gathered data to find bands of agreement and disparity; evaluating the bands of agreement and disparity using a multi-sensory model to determine the best fit for a dining event; generating a list of requisites necessary for the dining event; preparing management, staff and facility for delivery of the dining event; and staging the dining event. Additional steps include monitoring and evaluating the dining event; training staff subsequent to the dining event; and expanding the multi-sensory model.

The invention has diverse application, including establishments that provide the sole source of nourishment for a particular set of patrons, dining establishments seeking to offer flexibility and diversity in atmosphere as well as menu, and for individuals seeking guidance and assistance in creating a particular atmosphere.

OBJECTS OF THE INVENTION

A first object of the invention is to provide an apparatus which facilitates creation and conscious selection of a flexible dining atmosphere which integrates as many of the human senses as possible. A second object of the invention is to maintain flexibility within the apparatus sufficient to enable application to diverse marketplaces, including captive dining establishments, restaurants, and households. A further object of the invention is to facilitate consistent delivery of a desired atmosphere without necessitating unreasonable or unrealistic training or employee skill, and further without deviating from common skills available from employees. An additional object of the present invention is to stimulate positive actions which lead to positive interaction among patrons, employees and management. Another object of the invention is to enable an establishment to integrate beneficial life values into all aspects of the operations in a predictable and desirable way. Yet another object of the invention is that each individual patron experience the sensation that the event is being staged for and focusses on them. The foregoing and other objects, features and advantages will become more apparent from the detailed description of a preferred embodiment of the invention which achieves these objects.

BRIEF DESCRIPTION OF THE DRAWINGS

FIG. 8 illustrates an exemplary simple patron preference survey for soups.

FIG. 9 illustrates an exemplary moderately detailed patron preference survey for breakfast foods.

FIG. 10 illustrates an exemplary detailed patron preference survey for protein sources.

FIG. 11 illustrates an exemplary beverage patron preference survey including times of greatest preference.

FIG. 12 illustrates an exemplary personal choice patron preference survey.

DESCRIPTION OF THE PREFERRED EMBODIMENT

Figure 1:
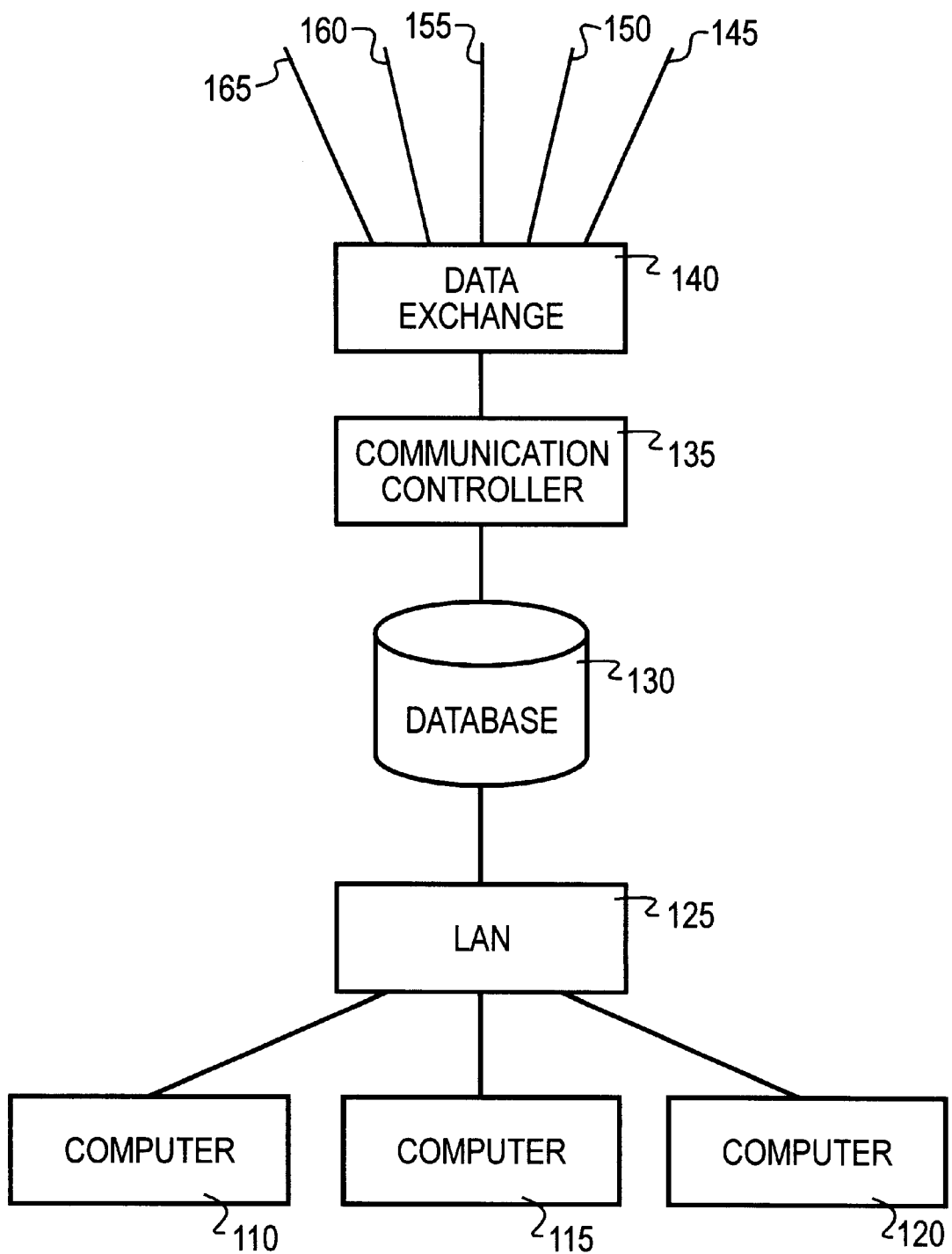
FIG. 1 illustrates the computerized apparatus of the preferred embodiment of the present invention by block diagram.

In the preferred embodiment, an apparatus for delivering dimensional dining most preferably comprises one or more computers 110, 115, and 120, which are interconnected through a Local Area Network (LAN) 125 to a central repository for information, database 130. From database 130 a communication controller 135 may control data exchange device 140 to exchange data through a modem connection 145, wireless transmission line 150, visual display line 155, direct switching relay line 160 or other communications channel 165 the information vital to the operation of the preferred embodiment. While computers 110–120 are illustrated, these devices may be microprocessor controlled terminals with computational capability much more limited than an ordinary general purpose computer. Nevertheless, there will be instances, particularly in the case of managerial input and reporting, where a fully functional general purpose computer will be most preferred. LAN 125 provides ready connection and communication among the various devices, which allows a more timely transfer of information from various computers 110–120 within the system, and through database 130. Database 130 may reside directly within a general purpose computer such as computers 110–120, or may preferably be a part of a stand-alone file server or processor. In the preferred embodiment system, there will be sufficient taxing of the other system resources that a stand-alone server type database will be preferable.

Figure 2:
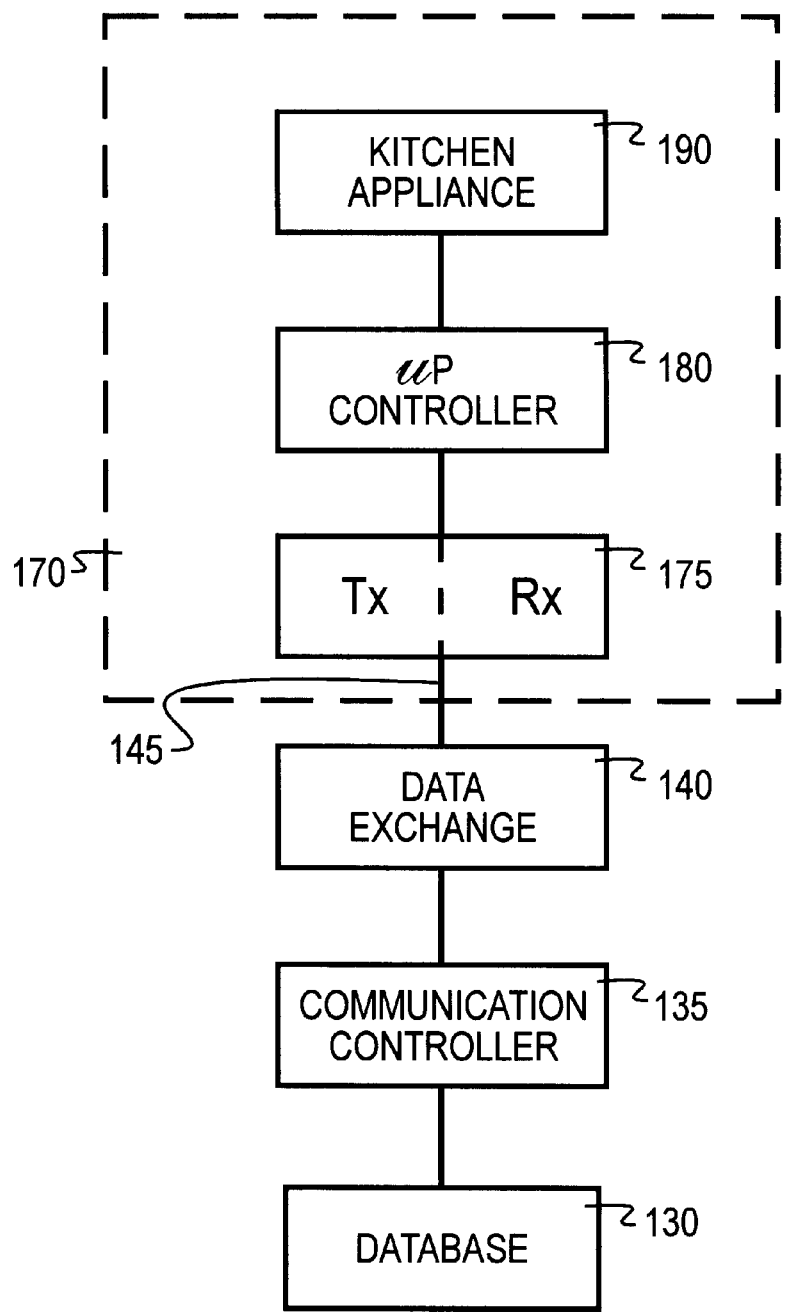
FIG. 2 illustrates an interface between the computerized apparatus of FIG. 1 and a single additional electronic device which is exemplary of the additional apparatus of the present invention.

As FIG. 1 illustrates, database 130 is the central repository for information and modelling of preferred operations, and so acts as the center of the illustration, with additional branches forming as one moves further from database 130. Extending from database 130 in a direction opposite from computers 110–120, which act as human interfaces, are the communication controller 135, data exchange 140 and various electronic data exchange interfaces, which serve to receive and send data to various other electronic components that may form a part of or integrate with the present invention. FIG. 2 illustrates how database 130 might be interconnected to a smart appliance 170, for example, through modem line 145. Smart appliance 170 will include a complimentary transmission (Tx) and reception (Rx) modem 175, which converts control signals and other information into digital signals which may be used by microprocessor controller 180 to directly control, for example, a kitchen appliance 190. Many diverse devices may be controlled through data exchange 140 and are contemplated by the present invention, and these not only include devices which would affect the taste component of dining, but which would similarly affect the other senses. Among the many conceived devices which are presently available and which could be controlled through an interface similar to FIG. 2 are specific lighting or illumination control devices for visual stimulation; various musical sequencers, sound synthesizers, and audio performance reproduction devices, such as compact disc jukeboxes, for audio stimulation; temperature, air flow and other environmental control devices for tactile environment control; and so forth. These devices may be used to control nearly any facet of an environment using technology already available, though the available technology was designed for very diverse purposes from the present invention. Due to the pervasiveness of modern electronics, there are actually very few devices that provide changes to a person's sensory environment which could not be controlled by the apparatus of the present invention.

Figure 3:
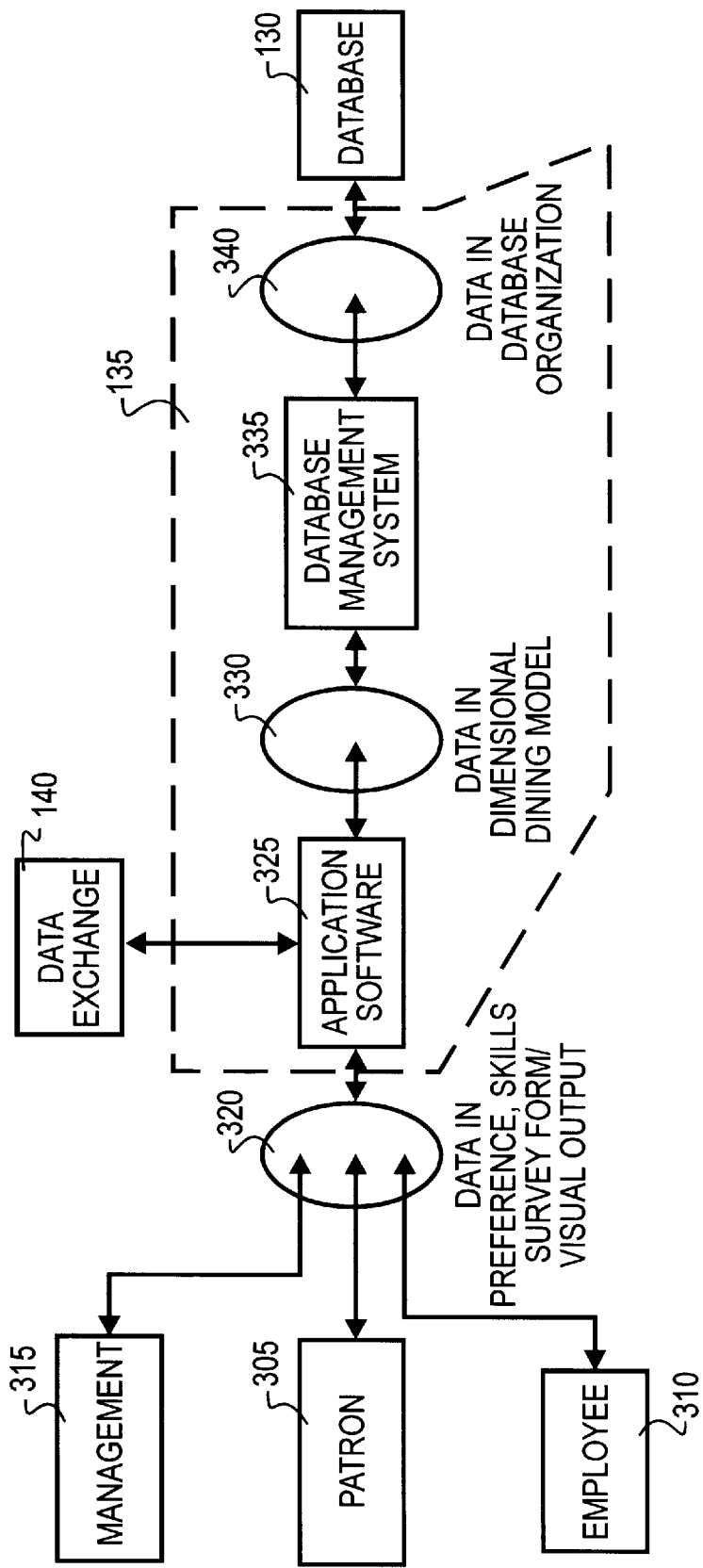
FIG. 3 illustrates the flow and storage of data within the computerized apparatus of FIG. 1.

FIG. 3 illustrates by schematic diagram the movement and exchange of data in the preferred embodiment. The critical source and destination of information is found at the left hand side, where patrons 305, employees 310 and management 315 all reside. The preferred embodiment system will most preferably maximize the utilization of the skills, experience and resources available from within each of the humans 305–315 interacting with the preferred embodiment. At the human side, data 320 is in the form of preference and skills survey forms, and reports and output that can readily be interpreted through the human senses. Data 320 is passed to and received from communication controller 135 via application software 325, which is used to interface the various external persons and electronic devices through data exchange 140, to database management system 335. Application software 325 does this by converting human and device specific data to and from dimensional dining model data 330. Applications software 325 will be encoded, as known by those skilled in the art of computer programming and generally available for hire, in accord with the specifications outlined herein. Model data 330 will be dependent upon the complexity of the system, but in the preferred embodiment will include and represent the most desired combinations of sensory experiences based upon the patrons' desires and limited only by whether management and employees are able to provide those experiences. This model data is preferably developed from actual dinning events, and is most preferably further refined based upon evaluation of the successful actions that formed these events. For example, one dining factor which is most preferably surveyed is the desired number of surrounding people at each regular meal time. A first set of patrons may be particularly social at breakfast, while a second set of patrons will shun contact with others until later in the day. Each patron may be regular to the establishment, particularly where the patrons are captive, such as in nursing homes or boarding schools, or may just choose their preferences for the occasional trip to the dining establishment. In this scenario, so long as management 315 through survey indicates that there is a flexible seating arrangement possible, such as through regular table and chair arrangement or through a low percentage of capacity at breakfast, then dimensional dining model data 330 will be tabulated by applications software 325 to divide patrons 305 according to individual or group seating, thereby best respecting each patron's desires. Similarly, if management 315 indicate the capacity to deliver separate and distinct music or sounds to different portions of the dining area, then the patrons 305 may be further grouped about the sound sources. If music or sounds may be delivered to very small sub-units within the establishment, such as at individual tables, then sub-grouping patrons 305 by musical likes may be less consequential, other than at the individual table level. Many additional factors, which will be discussed hereinbelow, are tabulated by applications software 325 into dimensional dining model data 330, as will be described hereinbelow. Once applications software 325 completes the necessary tabulations and conversions, it will be stored by database management system as data 340 in database organization format to database 130. Database 130 may take a variety of forms, including relational models, client-server, object oriented, or tabular or spreadsheet databases. The structure will be selected and optimized by those familiar with database management, and the particular structure will have little consequence herein, so long as database 130 is able to provide timely data to meet the demands of the specific system implementation.

Figure 4:
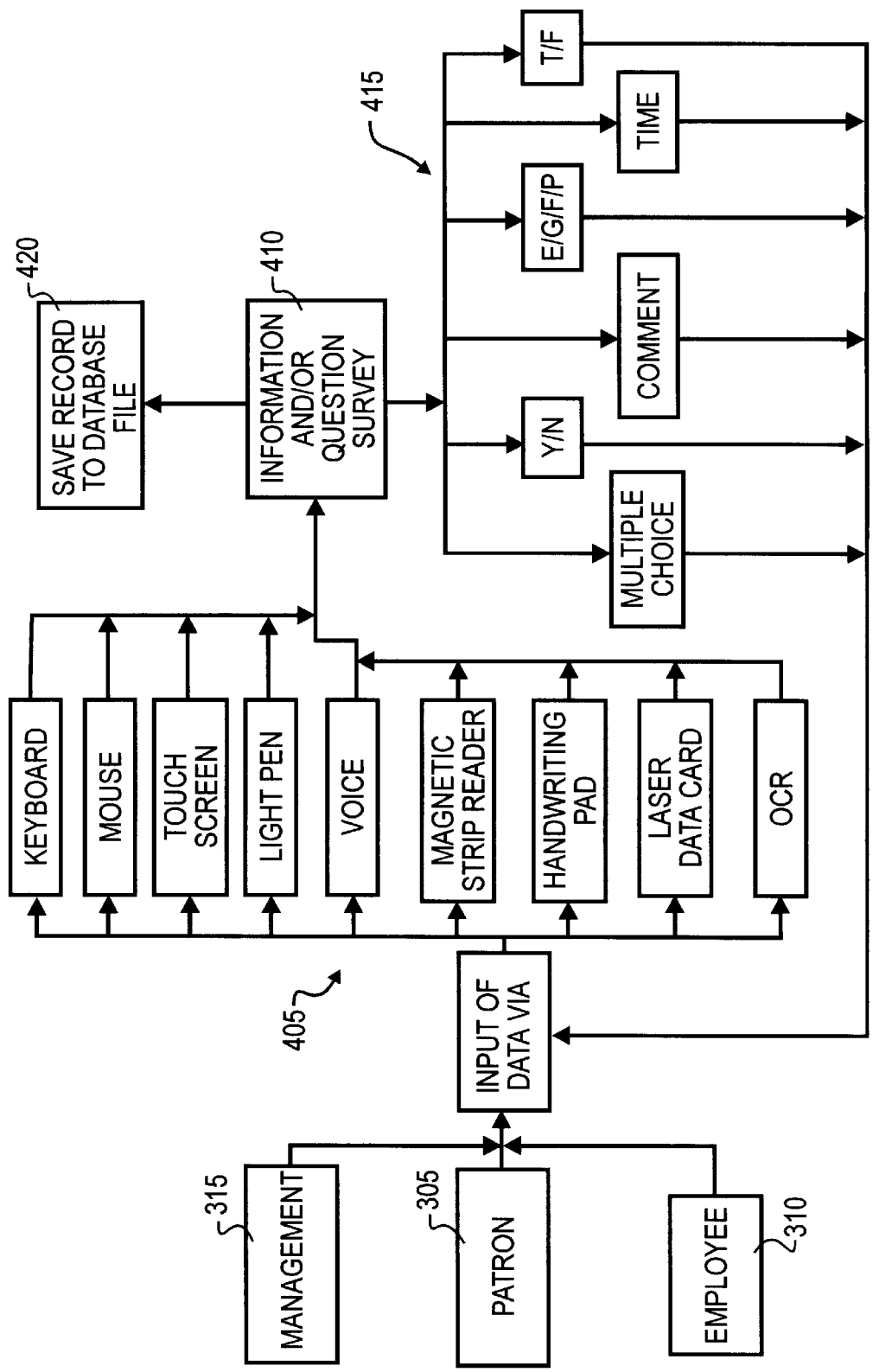
FIG. 4 illustrates the input from various users and the computerized apparatus of the preferred embodiment by flow chart.

FIG. 4 illustrates by flow chart the operation of a preferred human input interface component of application software 325, where patrons 305, employees 310 and management 315 provide input through to database 130. At a first step, data is input via one of a variety of preferred input devices at step 405, including keyboards, computer mice, touch screens, light pens, voice actuated software, magnetic strip readers, handwriting pads, optical character recognition (OCR) or OCR forms, laser data cards, or other various input mechanisms. An information and/or question survey is retrieved from database 130 by applications software 325 at step 410, the particular survey which will depend upon the identification of the class of human (patron, management, or employee) identified by an initial question or access code method. The survey may include a variety of answer types at step 415 depending upon the particular question, such as multiple choice, yes/no, comment, Excellent/Good/Fair/Poor, time or date, and true/false as shown at step 415, and through a suitable input device, the human will provide the desired input at step 405. Additional questions are asked, until the skills/preferences survey has been completed. At that time, the record will be saved to database 130 at step 420.

Figure 5:
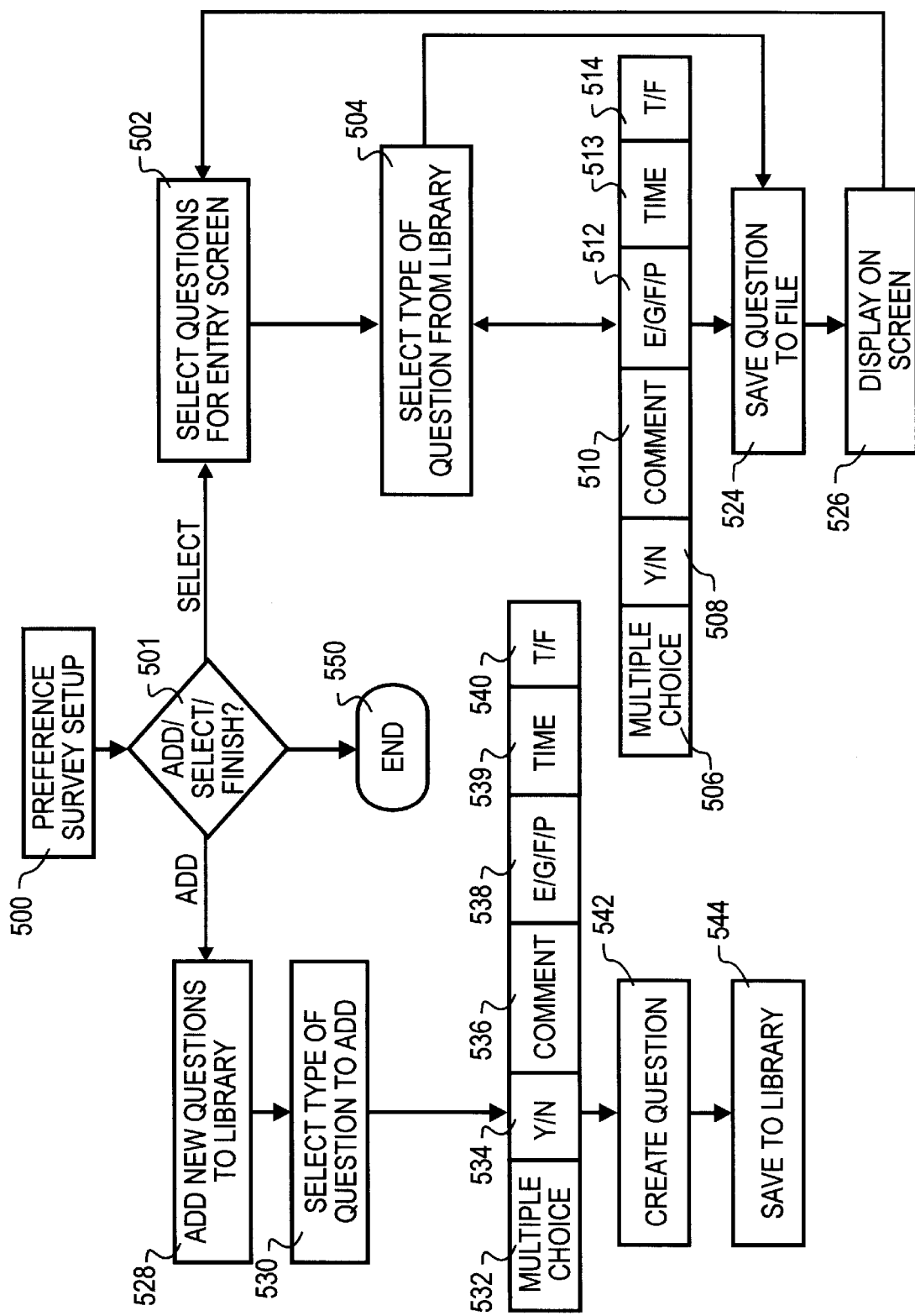
FIG. 5 illustrates the preferred embodiment development of preference survey questions.

FIG. 5 illustrates setup of a preference survey 500 by flow chart. This option will normally be selected from application software 325 as one available menu option to management 315 or dimensional dining system developers. A first step is to add new questions to the available library, as shown at step 528. If this option is chosen, then the type of question to add will be selected at step 530 from the available options shown as options 532–540. Next, the specific question will be created and entered at step 542, and saved to a library of questions within database 130 as shown at step 544. If the setup involved selection of questions for the survey, as shown at step 502, then the type of question 506–514 is selected from the library within database 130 as shown at step 504. A preferred question is selected and saved to a particular survey file in step 524, and the question is preferably displayed on screen in step 526. Program flow will then return to step 500. Once all questions for a particular preference survey are developed, program flow will proceed from step 501 to ending preference survey setup 500 at step 550.

Figure 6:
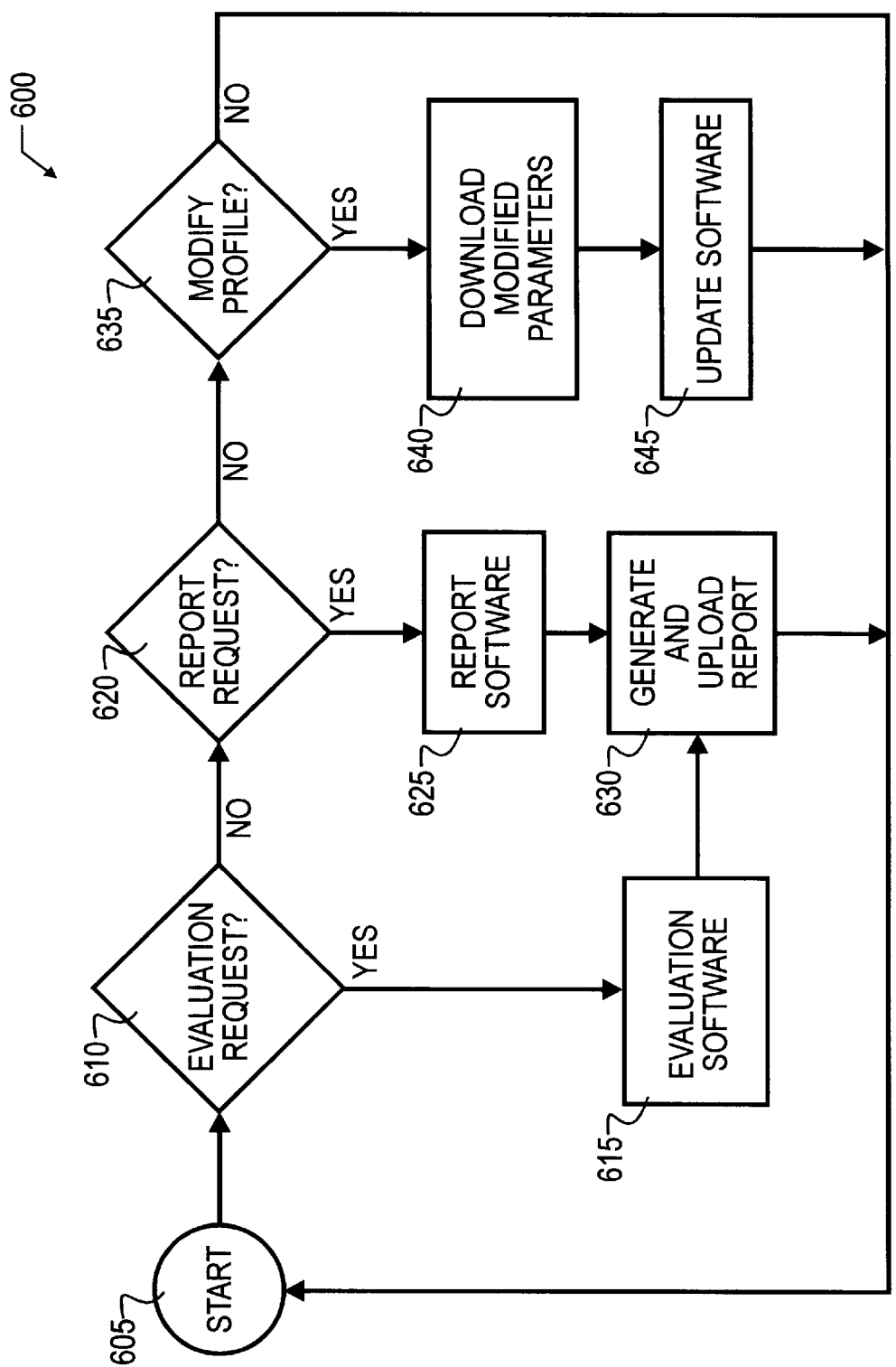
FIG. 6 illustrates the application of data from the database to various evaluation, reporting and control functions that are common to the various facets of the present invention.

FIG. 6 illustrates software management 600 of data within the present invention as the data applies to many diverse aspects of the invention. Software management 600 starts at step 605, which may occur as a result of an input through data exchange 140, or through data 320 from the human side being input into applications software 325. The nature of the initiating action that leads to step 605 is ascertained in steps 610, 620 and 635, where an evaluation, report or profile is to be acted upon. For example, an evaluation of data pertaining to an event staging may be requested, leading to data 320 initiating the start 605 of software management 600. In this case, evaluation software 615 is initiated and will perform tasks specific to evaluation of the event such as the input of results and deviations from the model. This will be subsequently followed by the generation and delivery of a report at step 630, and a return of the software to start 605 awaiting further action. Alternatively, a report request may have been received through data 320, in which case report software 625 is initiated. Report software 625 will perform the requisite filtering of data appropriate to the report and any necessary formatting that may be specific to the particular filter, and then at step 630 generate and deliver the report. In some instances, data 320 or data exchange 140 may indicate a need to modify a profile used by application software 325 or stored in database 130. In these instances, program flow will proceed to step 635, and subsequently to step 640 where the parameters to be modified are retrieved or downloaded from the appropriate source. The software and database are then updated as appropriate for the particular parameter at step 645, and flow returns again to start 605. It is important to recognize that these steps of software management 600 are applicable to very diverse operations, and are not limited in concept to any one function. These steps will apply equally as well to evaluation of the needs of a single patron and updating the patron's profile as to the evaluation of a staged dining event, and to the evaluation of the operation of an electronically controlled appliance. As illustrated, software management 600 is continuously cycling and looking for data input. However, this is not essential to the operation of the invention, and software management 600 may be instead called as required and then exited, as with any subroutine.

Figure 7:
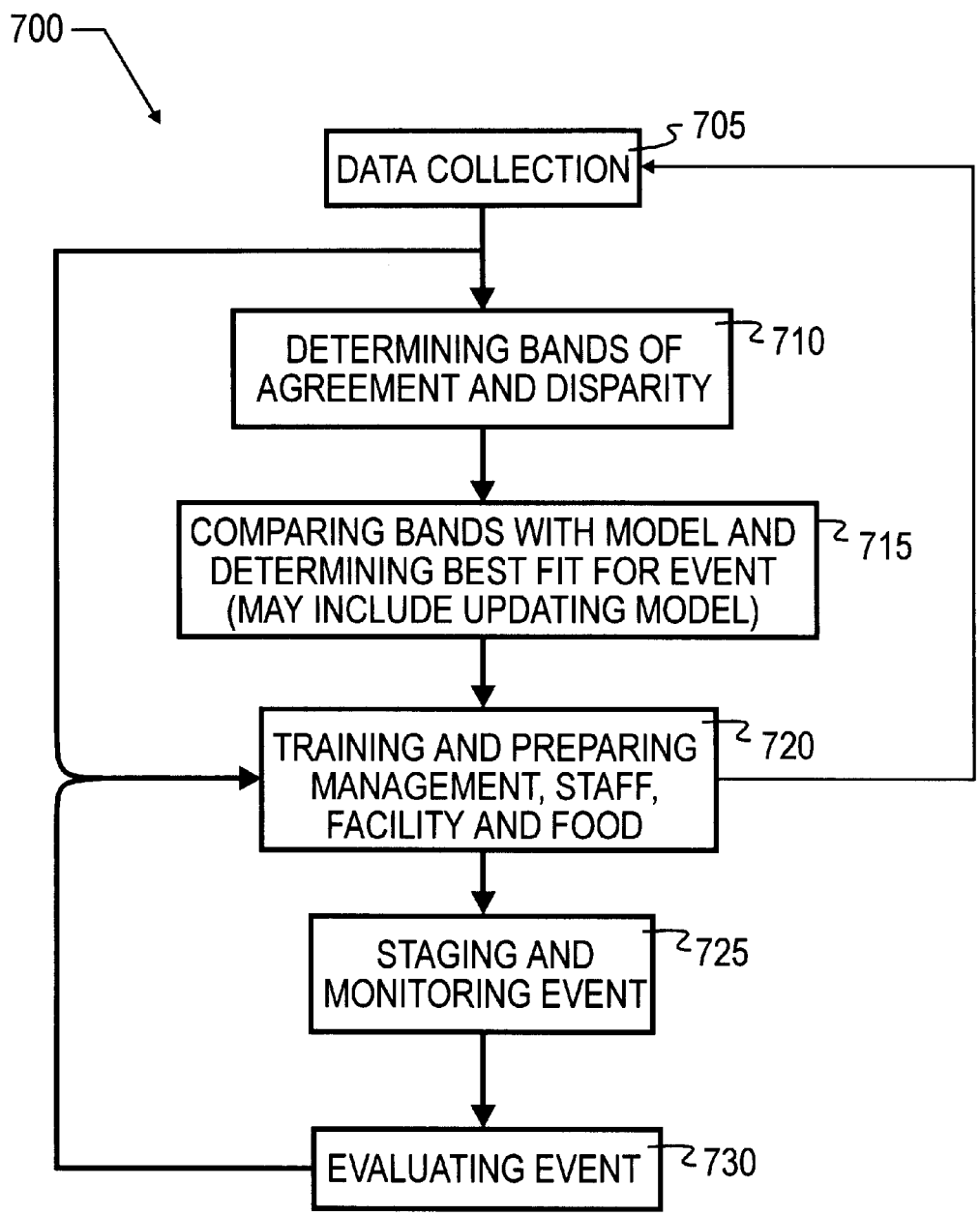
FIG. 7 illustrates by diagrammatic flow chart the more general steps of a preferred method for developing, coordinating and delivering a dining event in accord with the present invention.

FIG. 7 illustrates the more general steps 700 of a preferred method for developing, coordinating and delivering a dining event. An essential component of the invention is data collection step 705, which in the preferred embodiment is manifested as the preference survey, described in greater detail hereinbelow. Without the necessary data collection at step 705, whether collected in advance by the patron or subsequently by the staff and management based upon evaluation, the data collection enables application software 325 to work with data 330 in the dimensional dining model to establish the event, prepare staff, and deliver appropriate customization for each individual. While it will be understood by those of ordinary skill in the art that a relatively simple preference survey may be utilized, more detailed information is preferable, since the greater detail will enable more creative customization to each and every patron's preferences. As aforementioned with regard to FIG. 4, the exact method of collection is not critical to the invention, and may include paper forms, data cards, OCR systems, and other known methods of gathering and inputting data. The data gathering will most preferably include data from each individual patron 305 regarding personal information about who they are, such as their date of birth, past careers, hobbies, skills, interests and other information that may be deemed relevant at the time of design of the system. The food and atmosphere is a most preferred part of the data gathering as well, and will most preferably include the types of foods that are desired and those that are deemed distasteful, the sights and colors, music and sounds, smells, textures and other tactile preferences. Meal times, meal locations where several are available to choose from, and the style of delivery including family, buffet, large group, small group or individual serving are also important in data gathering step 705. In addition to data from patrons 305, data will also preferably be gathered in step 705 from employees 310 that form the staff. This information may include previous experience, skills, interests, hobbies, date of birth and other information that may be deemed important. Some of this information will be available from standard job applications, but that information will in most cases need to be supplemented with additional information. As with the patron information, additional data that is beneficial will be apparent to those skilled in the art when considered in conjunction with the foregoing list and the balance of the present disclosure. Finally, data will most preferably be collected from management 315 regarding the capabilities and equipment found within the establishment, as well as management preferences. This data may preferably include such information as capabilities regarding sound generation and delivery, such as whether sound may be provided and, if so, whether it is limited to a single sound system or whether it may be controlled within zones or independently at each seating location. Similar information regarding other equipment, including both manually controlled and computer controlled devices should be gathered to make the most optimal use of the capabilities of the establishment. Seating options, unusual dining arrangements, and other similar information should be provided through management data gathering at step 705. One again, the aforementioned specific data items are merely representative of the myriad of possible selections and are provided for the purposes of enablement, as required by the patent statutes. The apparatus associated with data gathering step 705 may include, for example, one or more of computers 110–120, and this data 320 will pass through applications software 325 and database management system 335 into database 130.

In step 710, bands of agreement and disparity within data 320 are identified through applications software 325, using algorithms for data analysis that are known in the data processing industry and which are commercially available. Using these commercial algorithms, the data is correlated for subsequent comparison in step 715 with additional data which is provided from the original system developers in the form of models for various events that may be staged. This is a most preferred part of the dimensional dining model, and allows a very complex set of data to be condensed quickly and with minimal effort into useful information that leads to the dining event. In summary, each diner's preferences are met and folded into a group experience that transforms an everyday, essential event of eating into an extraordinary event. The model, as noted hereinabove, will most preferably be provided to an establishment together with the balance of the application software, but will also most preferably be updated as described in reference to FIG. 6 and hereinbelow.

Once the dining experience is selected from the dimensional dining model in step 715, management and staff are trained and prepared, and facility and food are prepared in step 720. Staff training is very important, and will preferably include such factors as an awareness of self, a background on the patrons 305 attending the event, familiarity with props, themes and scripting that will help develop a desired atmosphere, and the features of the establishment. A part of the training includes standard issues relating to any food service operation, including food handling and mandatory health and safety regulations. Team building is also sometimes covered in standard food service operations, though it is more consequential and important in the present invention. Additional features such as unique greetings associated with a theme and event, costumes, catering to each individual patron 305, adjusting to patron 305 response during the event, stage type performance training regarding factors such as the audience, adapting to a changing stage, understanding who or what the background is, and so forth will also most preferably be addressed during training. Training staff 310 regarding awareness of self enables the establishment and dining event to best utilize special character traits and skills of each of the staff 310. When the event is established in step 715, facility and food preparation may also begin, and may include creating the requisite inventory of raw materials and supplies, and actual food preparation and facility decoration and other similar preparation. Database 130 may be used in association with applications software 325 and data exchange 140 to assist with inventory and food preparation, in the case where an establishment is equipped with appropriate electronic inventory equipment and electronically controlled appliances such as kitchen appliance 190.

As an offshoot from data collection step 705, training and preparing may begin, and does not require the completion of steps 710 and 715 for at least a portion of the training and preparing of step 720. Furthermore, some of the training and preparing of step 720 may reveal additional opportunities or talents that were previously undiscovered, and may therefore also feed back to additional data collection at step 705.

Once everything has been prepared, the event is ready to be staged and monitored at step 725. Through event staging, all of the data components 320 from preference surveys are melded together to form a unique experience. Because the variables are many and highly unlikely to be repeated, each event will be unique. As a result of the training in step 720 and the development of the event about successful models in step 715 stored in database 130, chances are greatly improved to achieve enjoyment of all participants in the event, including patrons 305, staff 310 and management 315. In essence, the present invention allows relatively predictable mass production of unique dining experiences.

The event staging will preferably appeal to each of the senses of each individual. This will be fit according to data 320 collected from and associated with that individual, and may lead, for example, to a particular seating arrangement, decorum around the seating, sounds delivered to the seating area, and foods and smells delivered thereto. When possible, it will also be preferable to appeal to each individual in the way that the individual is most moved. As is known from the field of psychology, different people are affected more by one sense or another, and, desirably, the particular sense which most greatly affects an individual will be emphasized during event staging 725. For example, verbal needs may be addressed with the language and intonation of welcoming and seating patrons, and the verbal communication during waiting on the patrons. Visual needs are addressed through favorite colors, textures, dining room decor and lighting, among other factors. Auditory or sonic needs may include, for exemplary purposes only, healing which has been associated with music, hearing deficits that may require special accommodation, and may further include the particular form of the sound, including vocals, instrumental sounds, live, canned, or synthesized sounds. Mathematical and logical needs include such factors as orderly or chaotic seating, order taking, the balance of a staff costume, table and room arrangements, the timing and arrangement of activities within an event, and patterns of those activities. Interpersonal needs are addressed through a recognition of the social needs of each person and group, and the appropriate recognition of positive leaders. Where the interactions are positive, even when unexpected, the event will ideally be staged to follow the interaction to a logical conclusion.

The meal is also a part of the staging 725, as is the performance of each member of the staff 310. Once again, in the most preferred embodiment each diner will experience the food they want, served in the way the want, at the time they want, and with unexpected features that further enhance the dining experience through a melding of the capabilities and experiences of all of those persons present.

To help ensure the success of the staging in step 725, most preferably simultaneously but off-site, the event will be monitored by persons highly trained in the staging of events. These individuals will preferably offer real-time feedback to the establishment to help staff 310 with any problems or unexpected events that may arise. Further, evaluation 730 is also most preferably in part simultaneous with the event, allowing any necessary additional training or preparing of step 720 to occur at the best possible moment, which may be during an individual staff member's trip to the kitchen, for example. Alternatively, various hand-held devices such as wireless pagers and other hand-held devices, partially concealed display systems, or even speaker systems may be used to communicate with staff 310. Once again, it is noteworthy that the data collection step 705 and training and preparing step 720 are not actual fixed in a time-ordered sequence, but may instead occur throughout the entire process.

In a preferred embodiment, the evaluating step 730 will be completed after the event staging, with each staff member 310 participating in the evaluation. As a result of the evaluation, additional training and preparing may be noted, and further data may be collected. For example, staff 310 may observe that the data pertaining to a patron 305 needs adjusted, or there may be new ideas generated regarding ways to refine the event model for an improved or enhanced event. Such additional or altered information would be entered through data collection 705 as one or more profile modifications 635 from FIG. 6.

Figure 13B:
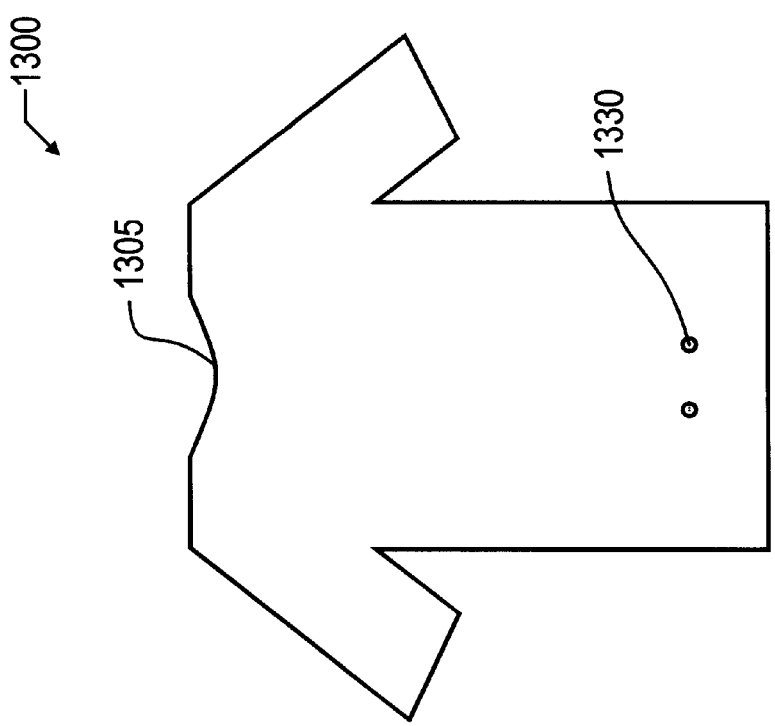
FIG. 13 illustrates an exemplary costume top for use in the preferred embodiment of the invention.
Figure 13A:
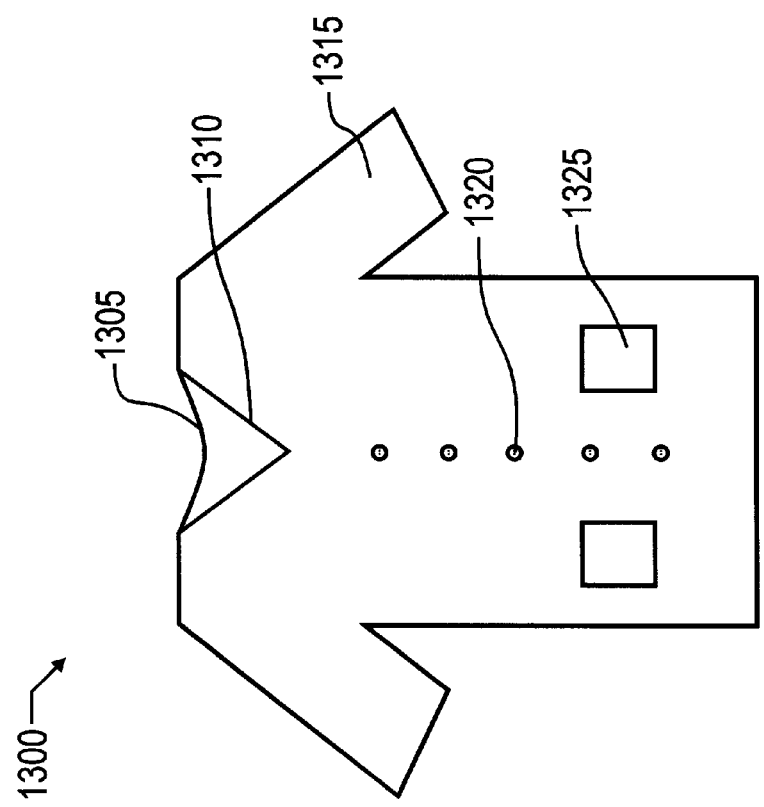
Figure 14:
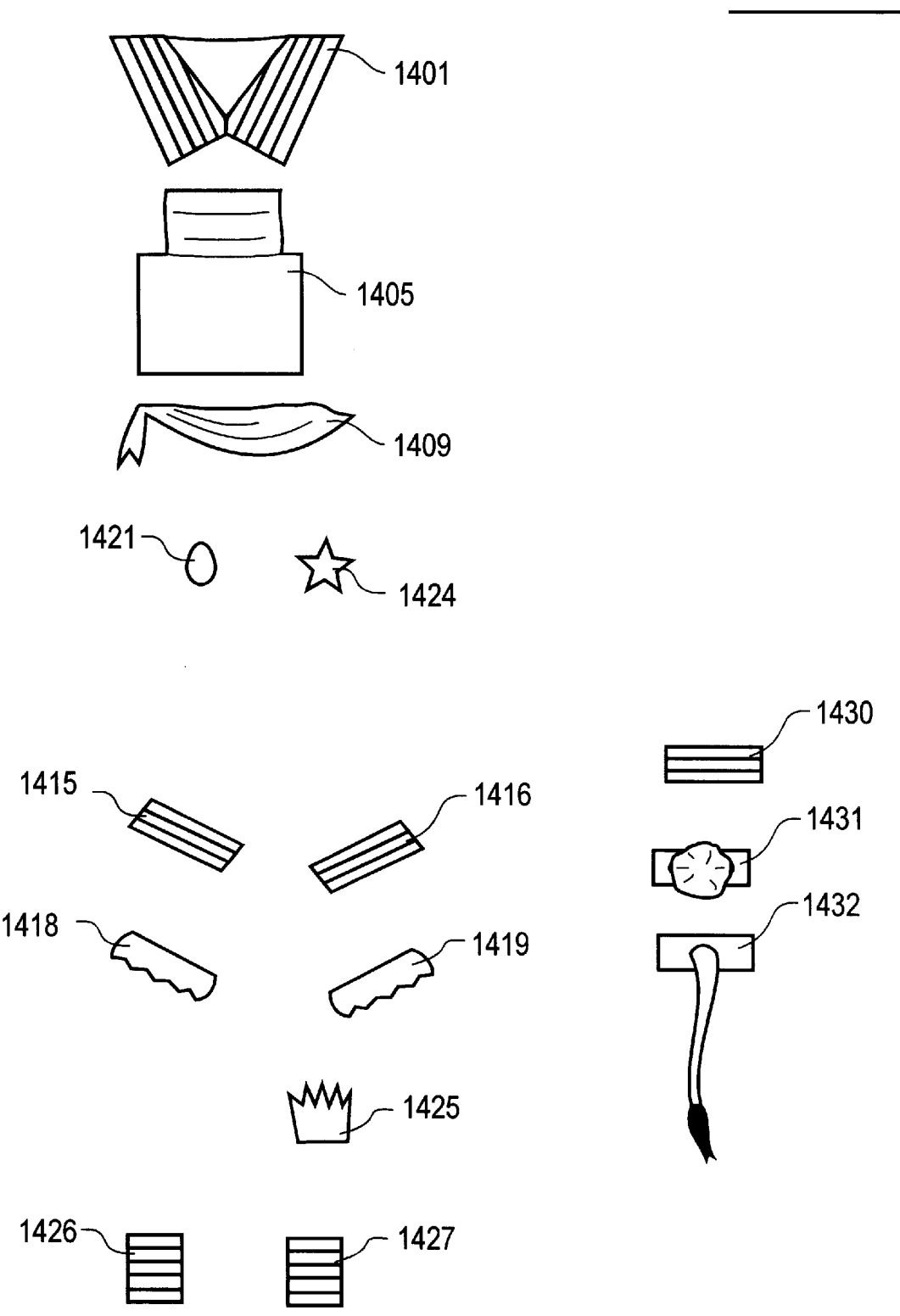
FIG. 14 illustrates exemplary modifiers for use in the preferred embodiment of the invention.
Figure 15:
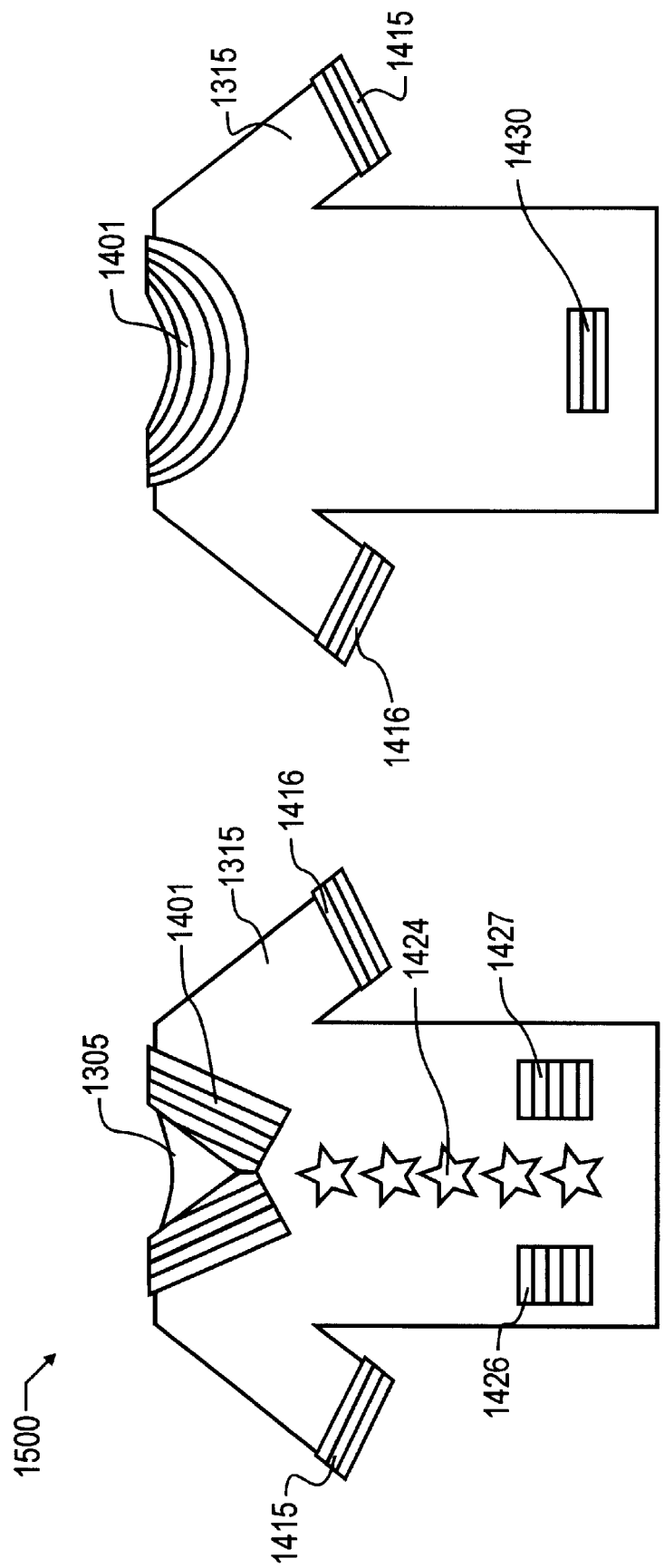
FIG. 15 illustrates the costume top of FIG. 13 in combination with one set of modifiers from FIG. 14, showing one possible embodiment.

To better illustrate the concepts of the invention, a number of patron preference surveys of varying complexity are illustrated in FIGS. 8–12, and sample preferred costumes are illustrated in FIGS. 13–15. Since these are exemplary, those skilled in the art will recognize that there are many alternatives available. However, these particular samples illustrate some of the diversity and scope of the invention. FIG. 8 illustrates a simple soup preference survey which only asks a patron for like/dislike indication for each of a variety of soups. The soups most preferably have been selected for the survey based upon the particular staff and management surveys that would indicate the cooks' capabilities for custom soups and the available soups from the vendor list. As a result, each patron preference survey will be custom depending upon data 320 entered by staff 310 and management 315.

FIG. 9 illustrates a more detailed patron preference survey pertaining to breakfast foods, including milk or cream, sugar or brown sugar, and fruit. FIG. 10 illustrates an even more detailed protein survey, including the option for individual preferences, preparation methods, and special requirements of the individual patron. FIG. 11 illustrates a beverage survey that offers options including particular brand preference, as well as time of day preferences. Finally, FIG. 12 illustrates a small part of the myriad of possible patron personal choices, including the times particular events are most preferred. In addition to the items listed, other examples of personal choice preferences suitable for survey are the seating preferences, hobbies, musical talents, musical style preferences, seasonal and holiday preferences, colors, temperatures, air patterns, and other such factors as may be controlled in a dining establishment, whether aforementioned hereinabove or otherwise known to those skilled in the art.

While it is well-known amongst dining establishments to control basic decor of the establishment for a special occasion, the present invention seeks to further decor to include readily changeable costumes which are worn by staff 310 during the staging of an event. FIGS. 13a and 13b illustrate the basic costume top 1300 about which theme specific features may be built by addition. Basic top 1300 includes a V-neck 1310 and a slightly rounded neck back 1305. Sleeves 1315 are short sleeved and plain. Buttons 1320 are provided on the front vertically up the center of the costume, and pockets 1325 are provided on each lower side of buttons 1320. As can be seen from FIG. 13b, two additional buttons 1330 are provided on the lower back of top 1300.

FIG. 14 illustrates various costume components for use with costume top 1300, including collars 1401, 1405 and 1409. Collar 1401 may, for example, include stripes of white alternating with red or blue in association with the fourth of July. Collar 1405 may be a plain or patterned neck treatment similar to a fake turtleneck, that will most preferably attach inside v-neck collar 1310. Collar 1405 may include patterns that resemble animal patterns or coloring, or other desirable appearance. Collar 1409 may be a simple bandanna that ties around a person's neck. Various collar treatments are contemplated, including turtlenecks, placate inserts, ruffled collars, broad collars, collars that allow bow ties, and other suitable collars.

Button covers 1421 and 1424 may also be used over buttons 1320 to further enhance the appearance of the costume. In the case of button cover 1424, there may be several colors of the star shape, and these may also be used with collar 1401 to produce a fourth of July costume, illustrated in entirety in FIG. 15. Button cover 1421 may be in the shape of an egg, which might, for example, be beneficial close to the Easter holiday to resemble Easter eggs. Sleeve cuffs 1415–1419 also offer the ability to customize the ends of sleeves 1315, and may preferably attach to Velcro inside of sleeves 1315. Sleeve cuffs 1415–1416 may be colored red, white and blue for the fourth of July, and they are shown in FIG. 15. Sleeve covers 1418 and 1419 may have a fluffy cotton appearance, which would, once again, be useful for Easter. Pocket covers 1425–1427 are also illustrated. Pocket cover 1425 may be tucked into a pocket with the rough edge extending out to resemble a kerchief, which, for example, could be used with bandanna 1409, and basic sleeve cuffs to simulate an audience member. Pocket covers 1426 and 1427 are the fourth of July covers of red, white and blue stripes. Finally, though the invention is in no way limited only to the particular features illustrated herein, various tails or costume backs 1430–1432 are illustrated. Tail 1432 is simply a rectangular patch carrying the fourth of July stripes, while tail 1431 will most preferably be a fluffy cotton tail simulating a rabbit's tail. Tail 1432 may be configured to simulate other various animals, including but not limited to horses, cows, pigs, rats, and so forth. Back clips can be used for changing the back side of the uniform. In addition, epaulets, though not illustrated, may also be provided on the shoulders. Vests, partial vests, lapel attachments, pants, slacks, trousers, pants cuffs, trouser pockets, socks, shoes or any other item of apparel can be added to the costume as a foundation or costume component, in accord with the teachings herein. The additional components can be fabricated to have various shapes, colors, textures, fabrics and patterns that are associated with the particular event or desired costume. By virtue of the separate and discrete nature of the decorative components 1401–1432, a staff will not require a separate costume, sized for each staff member, for each separate event. As will be apparent, requiring individually sized costumes for each event would necessitate an enormous inventory of costumes, which is not reasonable for the implementation of the invention. In accord with the invention, only a single basic costume 1300 needs sized for each staff member. The costume is then added to, or decorated, with components appropriate for each specific event.

As will be ascertained by those skilled in the dining art, the present invention may be modified in a nearly limitless way to suit the needs of any given establishment. The individual costumes may change in complexity and pattern from whimsical to highly fashionable to rough and rugged, depending upon the event to be staged. The preference surveys are adaptable to the needs and abilities of a given establishment, ranging from the most basic surveys for those establishments which may only encounter a patron once to highly detailed surveys for establishments that encounter the same patrons on a regular basis. As mentioned hereinabove, the present invention is applicable to facilities and establishments that have captive patrons, such as dormitories, nursing homes and other live-in facilities, as well as the restaurants, caterers, and the myriad of other food service establishments.

EXAMPLES

For an example, assume that the state fair is selected as the theme for an event to be staged.

Personal preference data is collected that shows that 50% like arts and crafts, 30% favor large animal exhibits, 24% favor vendor booths, and one person likes the abstract art exhibits. A food preference survey indicates that 30% like anything on a stick, 35% like church specials, 29% like fast food restaurants on site, and 1% like only the fresh fruits and vegetables. As will be understood, this same state fair event can be staged several ways.

Example 1

Using the costume to support a fair booth, one waiter/waitress can be associated with horses, another cows, another with quilt patterns another with flowers, etc. Each of the staff can dispense fair trivia about their booth and initiate a trivia game with orders at their tables. The dining room will preferably vary placemats and tablecloths to match the staff costume and booth, and people can be seated in association with their favorite booth. To address the individual who likes abstract art, an abstract art copy from a magazine or book can be hung near one table in an arts section. The menu would preferably include two church specials, corn dogs, fruit kabobs, McDonald's style hamburgers, fries and fresh vegetables. Music from the movie "State Fair" can be played throughout the meal.

Example 2

In this example, the focus of the event staging is less on visual and more on the food. Favorite recipes from patrons are fit into categories. The patrons act as judges and award ribbons and prizes. The waiters and waitresses are dressed as vendors. The tablecloths will preferably be red checked. Conversation is generated based upon the patron's own favorite experiences at the state fair.

Example 3

This example illustrates application of the invention to a restaurant setting. Additional survey data reveals that the restaurant loses half of the weekly regulars during the state fair. That data can be used to entice the weekly customer to return one more time in another week by having a state fair theme, at a time of year different from the actual state fair time. As with examples one and two, the staff and environment will be changed to match the theme. Alternatively, the data can be used to compete with the state fair by offering stomach training, for example. In this case, the patrons enter contests for eating the quickest, most hamburgers in the next hour, etc, where small prizes in food, branded items, etc are given away. The patrons will preferably be engaged in sharing skills, stories, reacting to the environment presented, or selecting one or more patrons to be the main character, and highlighting their expertise.

The exact nature of the model will vary with the experience and capabilities of a particular establishment. Furthermore, and as already illustrated, the invention is very adaptable to the patrons, staff and management. Therefore, while the foregoing details what is felt to be the preferred embodiment of the invention, no material limitations to the scope of the claimed invention is intended. Further, features and design alternatives that would be obvious to one of ordinary skill in the art are considered to be incorporated herein. The scope of the invention is set forth and particularly described in the claims hereinbelow.

I claim:

1. An apparatus for managing functions of a dining event, comprising:

a preference survey having questions regarding food and atmosphere preferences;

a means for inputting said preference survey into a computer;

a database within said computer for storing said input preference survey as data therein;

a model of a successful dining event, having as variables said preferences; and application software which correlates said data with said model and which generates reports based upon said correlation.

2. The apparatus for managing functions of a dining event of claim 1, further comprising means for developing said preference survey.

3. The apparatus for managing functions of a dining event of claim 1, further comprising a features survey having questions regarding features and capabilities of an establishment, said model further having said features as variables.

4. The apparatus for managing functions of a dining event of claim 1, further comprising a capabilities survey having questions regarding staff skills and experience, said model further having said capabilities as variables.

5. The apparatus for managing functions of a dining event of claim 1, wherein said application software further provides software control of electronic data exchange with remote locations.

6. The apparatus for managing functions of a dining event of claim 5, further comprising electronically controlled appliances responsive to said application software.

7. The apparatus for managing functions of a dining event of claim 6, wherein said electronically controlled appliances comprise means for generating sounds.

8. The apparatus for managing functions of a dining event of claim 6, wherein said electronically controlled appliances comprise means for controlling lights.

9. An apparatus for simplifying and enhancing various food service management functions in the creation and delivery of a unique and desirable dining experience for a patron at a dining location, comprising:

a means for assessing features and capabilities of said location and providing a representation of said location features and capabilities;

a means for surveying staff regarding skills, experiences and related potential assets and providing a representation of said staff survey results;

a means for polling individuals regarding sensory preferences pertaining to dining and providing a representation of said individuals' sensory preferences;

a model for staging a dining event which accepts as variables said representation of said location features and capabilities, said representation of staff survey results and said representation of individuals' sensory preferences;

means for correlating said representations of location features and capabilities with said representation of said staff survey results and said representation of said individuals' sensory preferences to produce correlation results;

a means for determining a best fit between said model and said correlation results; and a means for reporting said best fit.

10. The apparatus of claim 9 for simplifying and enhancing various food service management functions in the creation and delivery of a unique and desirable dining experience for a patron at a dining location, further comprising a means for monitoring said delivery of said dining event.

11. The apparatus of claim 10 for simplifying and enhancing various food service management functions in the creation and delivery of a unique and desirable dining experience for a patron at a dining location, further comprising a means for evaluating said delivery based upon said monitoring to produce evaluation results.

12. The apparatus of claim 11 for simplifying and enhancing various food service management functions in the creation and delivery of a unique and desirable dining experience for a patron at a dining location, further comprising means for communicating to said staff responsive to said evaluation results.

13. The apparatus of claim 9 for simplifying and enhancing various food service management functions in the creation and delivery of a unique and desirable dining experience for a patron at a dining location, further comprising:

means for identifying regions of disparity for individual customization;

wherein said staff may accommodate the regions of disparity through specific actions targeted to the disparity.

14. A method for developing, coordinating and delivering a dimensional dining experience including sensory experiences of sight and sound in addition to taste to provide essential food and beverage while simultaneously stimulating positive actions and interaction among people by optimally using resources, comprising the steps of:

gathering management data regarding management preferences;

gathering staff data regarding preferences;

gathering patron data regarding multi-sensory preferences;

correlating said management, staff and patron data to find bands of agreement and disparity;

evaluating said bands using a multi-sensory model of dining events to determine a best fit for said dining experience; and generating a list of requisites necessary for said dining experience.

15. The method for developing, coordinating and delivering a dimensional dining experience of claim 14 wherein said step of gathering management data further comprises gathering facilities capabilities and configuration.

16. The method for developing, coordinating and delivering a dimensional dining experience of claim 14 wherein said step of gathering staff data further comprises gathering staff skills and experiences.

17. The method for developing, coordinating and delivering a dimensional dining experience of claim 14 wherein said step of gathering patron data further comprises gathering patron experiences.

18. The method for developing, coordinating and delivering a dimensional dining experience of claim 14 comprising the further step of preparing management, staff and facility for delivery of said dining experience.

19. The method for developing, coordinating and delivering a dimensional dining experience of claim 14 comprising the further step of staging said dining event.

* * * * *